United States Patent
O'Hara

[15] 3,666,685
[45] *May 30, 1972

[54] CATALYTIC HYDROREFINING OF PETROLEUM CRUDE OILS AND RESIDUAL OILS

[72] Inventor: Mark J. O'Hara, Prospect Heights, Ill.
[73] Assignee: Universal Oil Products Company, Des Plaines, Ill.
[ * ] Notice: The portion of the term of this patent subsequent to Aug. 25, 1987, has been disclaimed.
[22] Filed: Apr. 23, 1970
[21] Appl. No.: 43,306

Related U.S. Application Data

[63] Continuation of Ser. No. 775,521, Nov. 13, 1968, abandoned.

[52] U.S. Cl. ..............................252/432, 208/111, 208/251, 208/254
[51] Int. Cl. ............................................................B01j 11/82
[58] Field of Search ............252/432; 208/111, 251 H, 251 R, 208/254 H, 254 R

[56] References Cited

UNITED STATES PATENTS

| | | | |
|---|---|---|---|
| 3,453,219 | 7/1969 | O'Hara | 252/432 |
| 3,525,684 | 8/1970 | O'Hara | 252/432 X |
| 3,294,659 | 12/1966 | O'Hara | 252/432 X |
| 3,483,253 | 12/1969 | Adam et al. | 252/432 X |

*Primary Examiner*—Patrick P. Garvin

[57] ABSTRACT

A catalyst composite comprising a metal of Group VIB and Group VIII and from about 1 to about 5 weight percent boron phosphate composited with a refractory inorganic oxide and characterized by a pore volume of at least about 0.4 cc. per gram in the 100–500 A. range. The catalyst composite is particularly useful for hydrorefining petroleum crude oils and residual crude oils.

6 Claims, No Drawings

CATALYTIC HYDROREFINING OF PETROLEUM CRUDE OILS AND RESIDUAL OILS

CROSS-REFERENCE TO RELATED APPLICATION

This application is a continuation of my copending application, Ser. No. 775,521 filed Nov. 13, 1968, now abandoned.

BACKGROUND OF THE INVENTION

The present invention relates to an improved catalyst composite particularly useful in the hydrorefining of petroleum crude oils and residual oils produced as a result of separating lighter fractions from petroleum crude oils. The residual oils are variously referred to as asphaltum oil, liquid asphalt, black oil, petroleum tailings, residuum, residual reduced crude, bunker fuel oils, etc. Petroleum crude oils and residual oils normally contain nitrogenous and sulfurous compounds, and heptane-insoluble asphaltenes which, alone or in combination, seriously impair the conversion of said oils to lower boiling more useful fractions thereof.

The nitrogenous and sulfurous compounds can be reduced to an acceptable level at hydrorefining conditions whereby they are converted to ammonia and hydrogen sulfide and readily separated as gaseous products. The reduction of heptane-insoluble asphaltenes is substantially more difficult. The heptane-insoluble asphaltenes which occur in petroleum crude oils and residual oils comprise a significant fraction thereof. For example, a Wyoming sour crude oil having API gravity of 23.2° at 60° F. have been shown to contain about 8.37 weight percent pentane-insoluble asphaltenes. These compounds tend to deposit within a reaction zone and on the catalyst situated therein forming a gummy hydrocarbonaceous residue which functions as a coke precursor. The deposition of this residue constitutes a significant loss of product and it is economically desirable to convert such asphaltenes into useful hydrocarbon fractions.

The hydrorefining process herein contemplated affords the advantage of converting heptane-insoluble asphaltenes into heptane-soluble hydrocarbons. The catalyst composite of this invention effects said conversion at hydrorefining conditions without incurring the relatively rapid deposition of coke and other hydrocarbonaceous matter. Further, depending on process conditions and the character of the crude or residual crude oil being processed, a substantial portion of the feed stock can be simultaneously hydrocracked to yield gasoline, kerosene, fuel oil or other valuable liquid products.

It is an object of this invention to provide an improved catalyst composite particularly adapted to hydrorefining or petroleum crude oils and residual crude oils. It is a further object to present a hydrorefining process for the conversion of petroleum crude oils and residual crude oils to lower boiling petroleum products of reduced asphaltene content.

SUMMARY OF THE INVENTION

In one of its broad aspects, the present invention embodies a catalytic composite comprising a metal of Group VIB and Group VIII and from about 1 to about 5 weight percent boron phosphate composited with a refractory inorganic oxide and characterized by a pore volume of at least about 0.4 cc. per gram in the 100–500 A. range.

Other objects and embodiments of this invention will become apparent with reference to the following detailed specification.

The refractory inorganic oxide component of the catalyst composite of this invention, while serving as a carrier for the other catalytic components, contributes to the over-all activity and stability of the catalyst composite. Suitable refractory inorganic oxides include alumina, silica, zirconia, boria, thoria, etc., or combinations thereof, particularly alumina in combination with one or more refractory inorganic oxides. Alumina composited with silica in a weight ratio of from about 1.5:1 to about 9:1, preferably from about 1.5:1 to about 3:1, is a particularly suitable refractory inorganic oxide and the further description of the catalyst composite of this invention is presented with reference thereto.

Many methods are known for preparing the preferred alumina-silica component. The simplest and most widely practiced methods involve either the precipitation of one of the components, alumina or silica, from a sol as a gel, said gel being thereafter impregnated with a solution of a suitable gel precursor of the other component which is thereafter precipitated to form an alumina-silica cogel, or alternatively, both components, alumina and silica, may be coprecipitated from a common sol. In the latter case it is most convenient to prepare an acidic silica sol and an alumina sol and then commingle the sols in the desired proportion. Alumina-silica composites comprising alumina in at least an equimolar amount with silica are especially well prepared by this last described method.

Several alternative procedures are available for preparing an acidic silica sol. In one method, a suitable mineral acid such as hydrochloric acid, sulfuric acid, or nitric acid is added to an aqueous solution of an alkali metal silicate, sodium silicate being preferred because of its low cost and general availability. In a second method, the order of addition is reversed, the water glass being added to the acid. The latter technique is preferred since the formation of the silica sol always occurs under acid conditions and there is no danger of the sol prematurely solidifying as is the case in the former method when the pH of the system is reduced from a high value to a low value. When using hydrochloric or sulfuric acid, concentrations thereof of from about 10 to about 30 percent are satisfactory. The water glass solution may be prepared from commercial sodium silicates, such as Philadelphia Quartz Company, brands, "E," "M," "N" or "S." The commercial water glass is first diluted with water to reduce the silica concentration thereof to about 5–15 weight percent. The commingling of acid and water glass is preferably carried out with agitation and at a temperature below about 95° F. The pH of the acidic sol at this stage will be in the range of 1.5–2. If desired, the silica sol may be aged at this pH for a period of 0.1–1 hour or more.

While an alumina sol precursor, such as an aqueous solution of aluminum sulfate, aluminum chloride or aluminum nitrate may be commingled with the silica sol, it is preferable to employ a true alumina sol. One method of preparing an alumina sol is in the electrolysis of an aluminum salt solution, such as an aqueous aluminum chloride solution, in an electrolytic cell having a porous partition between the anode and the cathode whereby an acid anion deficient aluminum salt solution, or sol, is recovered from the cathode compartment. Preferably, the alumina sol is an aluminum chloride sol prepared by treating an excess of aluminum particles in aqueous hydrochloric acid and/or aluminum chloride solution, usually at about reflux temperature until a quantity of aluminum has been digested sufficient to form a sol of a predetermined aluminum/chloride ratio which influences the pore volume and pore diameter characteristics of the alumina-silica composite as hereinafter related.

The separately formulated silica and alumina sols are then blended to yield an acidic hydrosol of alumina and silica. The alumina sol may be added to the silica sol, or the silica sol may be added to the alumina sol, or both may be continuously admixed as with an in-line blender. The mixing should be done with agitation and with water addition, if necessary, to prevent premature gelation at this point, since the blended sol is undergoing some polymerization as viscosity increases.

A preferred method of preparing the alumina-silica component which affords a convenient means of developing the desired physical characteristics of the final catalyst composite relates to the cogelation of an alumina sol and a silica sol to form spherical gel particles utilizing the well-known oil drop method. Thus, an alumina sol, suitably prepared by digesting aluminum pellets in aqueous hydrochloric acid solution, is commingled with a silica sol, suitably prepared by the acidification of water glass as is commonly practiced, and the sol blend dispersed as droplets in a hot oil bath whereby gelation occurs with the formation of spheroidal particles. In this type of operation, the silica is set thermally, the alumina being set chemically utilizing ammonia as a neutralizing or a setting agent. Usually the ammonia is furnished by an ammonia precursor which is included in the sol. The ammonia precursor is suitably urea, hexamethylenetetramine, or mixtures thereof, although other weakly basic materials which are substantially stable at normal temperatures hydrolyzable to ammonia with increasing temperature may be employed. Only a fraction of the ammonia precursor is hydrolyzed or decomposed in the relatively short period during which initial gelation occurs. During the subsequent aging process, the residual ammonia precursor retained in the spheroidal gel particles continues to hydrolyze and effect further polymerization of the alumina-silica whereby the pore characteristics of the composite are established. The alumina-silica particles are aged, usually for a period of from about 10 to about 24 hours at a predetermined temperature, usually from about 120° F. to about 220° F., and at a predetermined pH value. The aging time is substantially reduced utilizing pressure aging techniques. With alumina-silica ratios in the higher range, pressure aging tends to lower bulk densities.

As previously stated, the foregoing method affords a convenient means of developing the desired physical characteristics of the catalyst composite. The method includes a number of process variables which affect the alumina-silica composite. However, it should be noted that a particular process variable will not necessarily be as effective to produce a desired result with one alumina-silica ratio as with another. Generally, the aluminum/chloride ratio of the alumina sol will influence the average bulk density of the alumina-silica product and, correspondingly, the pore volume and pore diameter characteristics attendant therewith, lower ratios tending toward higher average bulk densities. Other process variables affecting the physical properties of the catalyst support include the time, temperature and pH at which the particles are aged. Usually, temperatures in the lower range and shorter aging periods tend toward higher bulk densities. Surface area properties are normally a function of calcination temperature, a temperature of from about 800° F. to about 1,500° F. being suitably employed.

The boron phosphate component, comprising from about 1 to about 5 weight percent of the catalyst composite, can be added to the alumina-silica, or other selected refractory inorganic oxide, utilizing an aqueous impregnating solution comprising phosphoric and boric acids, said cids being employed in equimolar amounts and in a total amount to yield a finished catalyst composite containing from about 1 to about 5 weight percent boron phosphate, and preferably from about 2 to about 4 weight percent.

The catalyst composite of this invention further comprises a metal of Group VIB and Group VIII. The catalyst composite will thus comprise chromium, molybdenum, and/or tungsten in combination with one or more metals of Group VIII, i.e., iron, nickel, cobalt, platinum, palladium, ruthenium, rhodium, osmium and iridium. Of the Group VIB metals, molybdenum is preferred. The Group VIB metal comprises from about 5 to about 20 weight percent of the final catalyst composite. The Group VIII metal which is preferably nickel, is suitably effective in amounts to comprise from about 0.1 to about 10 weight percent of the final catalyst composite.

While the boron phosphate and Group VIB and Group VIII metal components can be added to the alumina-silica carrier material utilizing individual impregnating solutions thereof and in any desired sequence, it is preferred to employ a common impregnating solution. Thus, the aforesaid aqueous impregnating solution comprising phosphoric and boric acids will preferably further include a soluble compound of a metal of Group VIB and Group VIII. The impregnating solution will thus include a soluble compound of a Group VIB metal such as ammonium molybdate, ammonium paramolybdate, molybdic acid, molybdenum trioxide, ammonium chromate, ammonium peroxychromate, chromium acetate, chromous chloride, chromium nitrate, ammonium metatungstate, tungstic acid, etc. The impregnating solution will further comprise a soluble compound of a metal of Group VIII, suitable compounds including nickel nitrate, nickel sulfate, nickel chloride, nickel bromide, nickel fluoride, nickel iodide, nickel acetate, nickel formate, cobaltous sulfate, cobaltous fluoride, ferric fluoride, ferric chloride, ferric nitrate, ferric sulfate, ferric formate, ferric acetate, platinum chloride, chloroplatinic acid, chloropalladic acid, palladium chloride, etc.

Development of the pore characteristics herein defined, i.e., a pore volume of at least about 0.4 cc. per gram in the 100–500 A. range, is particularly favored by a relatively brief steam treatment of the catalyst composite prior to calcination. The wet impregnated material may be treated in a steam atmosphere by heating the same at a temperature of from about 200° F. to about 400° F. and evaporating the impregnated material to dryness over a period of from about 0.5 to about 1.5 hours prior to a final calcination thereof. Suitably, the alumina-silica carrier is immersed in the impregnating solution in a rotary steam drier, soaked for a brief period of at least about 5 minutes at ambient temperature, and the impregnating solution thereafter evaporated to dryness over said period of from about 0.5 to about 1.5 hours. The catalyst composite, thus dried, is thereafter oxidized in an oxygen containing atmosphere such as air, at a temperature of from about 800° F. to about 1,500° F. for a period of from about 1 to about 8 hours or more.

The hydrorefining process, utilizing the catalyst composite of this invention, is effected by reacting the petroleum crude oil, or residual oil, with hydrogen in contact with said catalyst composite. The charge stock, admixed with hydrogen, is heated to an operating temperature in the range of from about 255° C. to about 500° C., and contacts the catalyst under an imposed pressure of from about 500 to about 5,000 psig. The total reaction zone effluent is passed into a suitable high pressure-low temperature separator in which a gaseous phase rich in hydrogen is removed and recycled to combine with fresh hydrocarbon charge. The remaining normally liquid reaction zone effluent is then introduced into a suitable fractionator or stripping column for the purpose of removing hydrogen sulfide and light hydrocarbons including methane, ethane and propane. Although the normally gaseous phase from the high pressure separator may be treated for the purpose of removing ammonia formed as a result of the destructive removal of nitrogenous compounds, a more convenient method involves the introduction of water downstream or in the gas phase from the high pressure separator, and removing said water and absorbed ammonia via suitable liquid level control means disposed in said high pressure separator. In some cases, depending on process conditions and the nature of the charge, a substantial portion of the crude oil or residual oil charge may be simultaneously hydrocracked to yield gasoline, kerosene, fuel oil, or other valuable liquid products. In other cases, the major portion of the charge may pass through the hydrorefining zone virtually unchanged except for a substantial reduction in the concentration of metals, sulfur, nitrogen, oxygen and oil-insoluble asphaltenes.

EXAMPLE

A calcined alumina-silica in the form of 1/16 inch spheres and comprising 63 weight percent alumina and 37 weight percent silica was impregnated with 2 weight percent nickel, 16 weight percent molybdenum and various amounts of boron phosphate (1.2, 2.5, 5.0 and 10 weight percent). Impregnation was by means of an impregnating solution prepared by dissolving 85 percent molybdic acid ($MoO_3$) in ammoniacal solution, and adding phosphoric ($H_3PO_4$) and boric ($H_3BO_3$) acids thereto followed by an ammoniacal solution of nickel nitrate hexahydrate ($NiNO_3 \cdot 6H_2O$). A catalyst composite was also prepared in substantially the same manner but excluding boron phosphate. The alumina-silica spheres were impregnated in a rotary steam dryer, the impregnating solution being evaporated to dryness over a period of about 1 hour. The impregnated material was dried an additional hour at 125° C. in a drying oven and then heated in a muffle furnace at 590° C. for about 1 hour. The pore volume characteristics, measured by mercury poresimeter, of the various catalysts are tabulated below.

Each catalyst composite was evaluated by processing a crude tower bottoms, characterized by an API of 12.0, 6.75 percent $C_7$-insoluble asphaltenes, and 3.77 percent sulfur, over the catalyst at a temperature of 380°–425° C. under 3,000 psig hydrogen, and at a liquid hourly space velocity of 1.0. Hydrogen was recycled at the rate of 15,000 cubic feet/barrel of charge stock. The results are tabulated below.

| $BPO_4$ Content, wt. % | 0 | 1.2 | 2.5 | 5 | 10 |
|---|---|---|---|---|---|
| Total Macro Pore Vol., cc/gm. | 0.19 | 0.62 | 0.65 | 0.66 | 0.63 |
| Pore Size Distribution, cc/gm. | | | | | |
| 117–200 A. | 0.18 | 0.34 | 0.20 | 0.00 | 0.04 |
| 200–300 A. | 0.01 | 0.18 | 0.23 | 0.20 | 0.06 |
| 300–500 A. | | 0.08 | 0.20 | 0.40 | 0.34 |
| 500–1000 A. | | 0.01 | 0.02 | 0.05 | 0.18 |
| $C_7$-insoluble asphaltene conv., % | 50.5 | 59.2 | 65.4 | 60.3 | — |
| Sulfur conversion, % | 85.1 | 84.1 | 85.7 | 78.2 | — |

It will be observed with reference to the above tabulation that the omission of boron phosphate from the catalyst resulted in a total macro pore volume (117–58,000 A.) of only 0.19 cc/gm as opposed to a total macro pore volume in the 0.62–0.66 cc/gm range for the boron phosphate-containing catalysts. Although the amount of boron phosphate included in the catalyst appears to have little effect on the total macro pore volume, it has a significant effect in the macro pore size distribution. It will be further noted that the boron phosphate component enhances catalyst activity with respect to the conversion of $C_7$-insoluble asphaltenes, the optimum boron phosphate level being at about 2.5 weight percent, substantially all of the pore volume being in the 117–500 A. range, with 0.43 cc/gm being in the 117–300 A. range.

I claim as my invention:

1. A catalytic composite comprising from about 5 to about 20 weight percent of a Group VIB metal, about 0.1 to about 10 weight percent of a Group VIII metal, and about 1 to about 5 weight percent boron phosphate composited with a refractory inorganic oxide, at least about 0.4 cc/gm of the total pore volume of said catalytic composite being associated with pores whose average pore diameter is in the range of from about 100 to about 500 A.

2. The catalytic composite of claim 1 further characterized in that said refractory inorganic oxide comprises alumina composited with silica in a weight ratio of from about 1.5:1 to about 9:1.

3. The catalytic composite of claim 1 further characterized in that said refractory inorganic oxide comprises alumina composited with silica in a weight ratio of from about 1.5:1 to about 3:1.

4. The catalytic composite of claim 1 further characterized in that said catalytic composite has a pore volume of at least 0.5 cc/gram in the 100–300 A. range.

5. The catalytic composite of claim 1 further characterized in that said catalytic composite contains from about 2 to about 4 weight percent boron phosphate.

6. The catalytic composite of claim 1 further characterized in that said Group VIB metal is molybdenum and said Group VIII metal is nickel.

* * * * *